No. 854,057. PATENTED MAY 21, 1907.
W. J. RYAN & C. R. BURKE.
PROCESS FOR OBTAINING LUBRICATING OIL FROM CRUDE OIL.
APPLICATION FILED MAY 2, 1906.
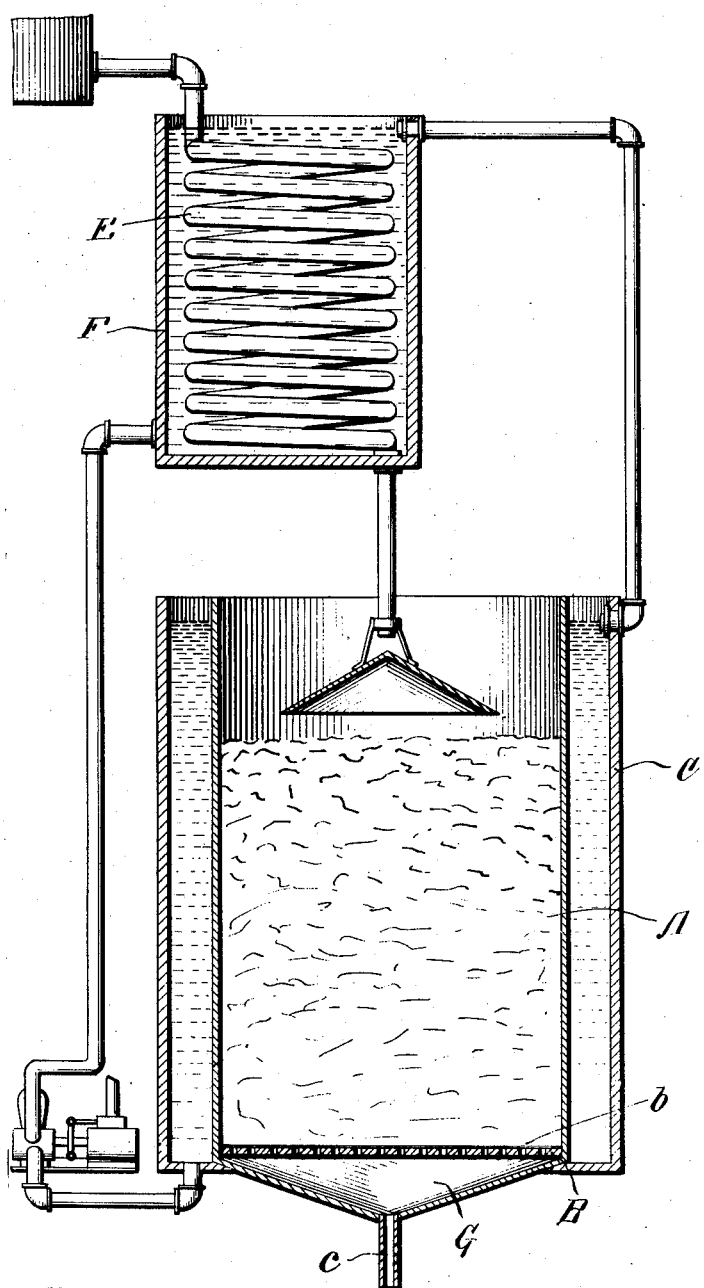
WITNESSES:
INVENTORS
William J. Ryan
BY Charles R. Burke
Whitaker Prevost
Attorneys

UNITED STATES PATENT OFFICE.

WILLIAM J. RYAN, OF CHESTER, AND CHARLES R. BURKE, OF OVERBROOK, PENNSYLVANIA.

PROCESS FOR OBTAINING LUBRICATING-OIL FROM CRUDE OIL.

No. 854,057.  Specification of Letters Patent.  Patented May 21, 1907.

Application filed May 2, 1906. Serial No. 314,866.

*To all whom it may concern:*

Be it known that we, WILLIAM J. RYAN, a citizen of the United States, residing at Chester, in the county of Delaware, State of Pennsylvania, and CHARLES R. BURKE, a citizen of the United States, residing at Overbrook, in the county of Montgomery and State of Pennsylvania, have invented certain new and useful Improvements in Processes for Obtaining Lubricating-Oil from Crude Oil; and we do hereby declare the following to be a full, clear, and exact description of the invention, such as will enable others skilled in the art to which it appertains to make and use the same.

Our invention relates to a process for obtaining oil for lubricating purposes from crude petroleum or from products derived therefrom, and simultaneously decolorizing the oil to a greater or less degree and removing gummy and other deleterious elements therefrom.

The process hereinafter set forth is mainly applied by us in the production of lubricating oils of a very low cold test.

In order that the invention may be clearly understood, we have illustrated in the accompanying drawing one form of apparatus which we may use in carrying out our improved process, although we do not limit ourselves to such apparatus, as other forms may be successfully used.

In the drawing we show a view partly in section, of one form of apparatus by which we obtain the desired result in carrying out our process.

Similar letters of reference indicate identical parts throughout.

The filter A may be of any ordinary construction, and is provided at a portion of its depth with a perforated diaphragm B. Cotton or other fabric *b* is placed over the diaphragm and upon this is placed the filtering material, such as bone, clay, sand or analogous substances. The filter is designed in this instance to be placed in a brine tank C in which is a quantity of chilled brine, cold being applied to the brine by any ordinary method of refrigeration. The filter should be chilled to any desired degree, depending on the temperature at which the oil is desired to flow.

In carrying out our improved process, it is found that in order to secure the best results, the material treated must not be of too great a density or specific gravity. When such material possesses a specific gravity of more than 35° Baumé it is necessary to dilute the same by naphtha, alcohol or analogous liquid.

The material to be treated is passed through the coil of pipe E, which is maintained at the proper temperature in this instance by the brine in the tank F. In passing through this coil the material is reduced to the temperature desired, and it is then passed through the filter A, which is in like manner maintained at the degree of temperature desired. The temperature of the coil and of the filter depends upon the cold test desired for the product. The material after passing through the coil will be reduced to nearly the temperature of the coil and the filter should be maintained at such a temperature as to prevent any material increase of its temperature during its passage through the filter. The temperature will ordinarily be between $-10°$ and $40°$ Fahrenheit, depending upon the character of the product desired. The lower the temperature of the apparatus the lower the cold test of the oil flowing from the discharge pipe *c*. The oil thus cooled and filtered is then reduced by heat or steam or by the use of both to the desired flash test. The color of the filtered oil depends somewhat upon the depth of the filtering material through which it is passed. By increasing the thickness of the filtering material the oil may be made to assume a lighter color. The passing of the material through the filter as herein described removes therefrom gummy and other deleterious substances and greatly increases its value as a lubricating oil.

If the material to be treated is of the required specific gravity and the same will not be unduly increased by so doing, it may be treated by fire or steam and brought to the desired flash test before cooling and filtering it as described. If the material has been brought to the desired flash test and it is found that its density or specific gravity is too great for the successful carrying out of our process, it should be diluted with naphtha or equivalent liquid, and after passing through the filter the naphtha or other diluent should be driven off by heat or steam; the residue after so doing will then be found to be a lubricating oil of the character desired.

What we claim and desire to secure by Letters Patent is:—

1. The process of producing lubricating oils from materials of the petroleum class which consists in reducing the temperature of the material to a temperature of from −10° to 40° Fahrenheit and filtering the same at substantially the same temperature, the process including the additional step of raising said material to a higher flash test, substantially as described.

2. The process of producing lubricating oils from materials of the petroleum class, which comprises the elimination of deleterious elements, by reducing the temperature of the material treated to a temperature varying from −10° to 40° Fahrenheit, passing the same through a filter at substantially the same temperature, and raising the material to a higher flash test, the process also including the varying of the color of the product by passing the material for a greater or less distance through the chilled filtering material, substantially as described.

3. The process of producing lubricating oils from crude petroleum which comprises the reduction of such oil to the desired flash test, bringing said material to the specific gravity of from 70° to 35° Baumé, then reducing it to a temperature of from −10° to 40° Fahrenheit, and filtering the same at substantially the same temperature, substantially as described.

4. The process of producing lubricating oils from heavy materials of the petroleum class, which comprises the bringing of such materials to the specific gravity of from 70° to 35° Baumé by diluting the same with naphtha or its equivalent, reducing the temperature of the diluted material to a temperature of from −10° to 40° Fahrenheit and filtering the same at substantially the same temperature and finally eliminating the naphtha or equivalent, substantially as described.

In testimony whereof we affix our signatures, in the presence of two witnesses.

WILLIAM J. RYAN.
CHARLES R. BURKE.

Witnesses:
L. P. WHITAKER,
J. K. MOORE.